United States Patent [19]

Hansen, III et al.

[11] 4,022,114

[45] May 10, 1977

[54] FLEXIBLE DIAPHRAGM CONSTRUCTION

[75] Inventors: Charles C. Hansen, III, Hinsdale; John D. Nilles, Roselle; Olaf E. Kivioja, Villa Park, all of Ill.

[73] Assignee: Refrigerating Specialties Company, Broadview, Ill.

[22] Filed: Jan. 15, 1976

[21] Appl. No.: 649,338

Related U.S. Application Data

[63] Continuation-in-part of Ser. No. 485,784, July 5, 1974, abandoned, which is a continuation-in-part of Ser. No. 279,538, Aug. 10, 1972, abandoned.

[52] U.S. Cl. .............................. 92/98 R; 92/100; 92/103 F; 156/87; 428/136; 428/198
[51] Int. Cl.² ...................... F01B 19/00; F16J 3/02
[58] Field of Search ............... 92/5 R, 98 R, 98 D, 92/97, 99, 100, 103 R, 103 F, 103 SD, 47; 156/87; 428/196, 197, 198, 136

[56] References Cited

UNITED STATES PATENTS

| | | | |
|---|---|---|---|
| 2,501,957 | 3/1950 | Moore | 92/103 |
| 2,605,204 | 7/1952 | Benedict | 156/87 |
| 3,189,041 | 6/1965 | Hansen | 251/86 |
| 3,387,494 | 6/1968 | Golay | 92/103 |
| 3,505,083 | 4/1970 | Schelhorn | 428/198 |
| 3,551,232 | 12/1970 | Thompson | 156/87 |
| 3,551,270 | 12/1970 | Sharkey | 156/87 |
| 3,674,109 | 7/1972 | Murase | 156/87 |
| 3,712,846 | 1/1973 | Daniels | 428/198 |

*Primary Examiner*—Martin P. Schwadron
*Assistant Examiner*—Abraham Hershkovitz
*Attorney, Agent, or Firm*—Watson D. Harbaugh

[57] ABSTRACT

The longevity and safety of pressure-responsive, flexible diaphragms is improved by providing laminated construction of sealing and reinforcing layers that "breathe" through a portion of their cross sections. In one embodiment the flexible diaphragm comprises a laminate having a layer of perforated fabric-like reinforcing material on the low pressure side and a layer of impermeable elastomeric sealing material on the high pressure side with or without an additional layer of said fabric, with or without perforations on the high pressure side and with the areas of bond between the reinforcing material and sealing material being substantially continuous. In another embodiment the laminate comprises an inner layer of perforated fabric-like material bonded to outer layers of perforated elastomeric material on the low pressure side. The elastomeric sealing material layer on the high pressure side of this latter embodiment may be perforated.

9 Claims, 13 Drawing Figures

FLEXIBLE DIAPHRAGM CONSTRUCTION

RELATED APPLICATION

This application is a continuation-in-part of copending application Ser. No. 485,784 filed July 5, 1974 which in turn is a continuation-in-part of application Ser. No. 279,538, filed Aug. 10, 1972, by the instant inventors, now both abandoned.

BACKGROUND OF THE INVENTION

Laminated diaphragms are commonly used in pressure regulator and the like where pressure response and flexing are required. Such diaphragms normally consist of an inner layer of porous reinforcing fabric and outer layers of impermeable flexible sealing or elastomeric material. Different types of impermeable elastomers are used as well as different types of porous reinforcing material and the strength of the bond between the layers of the laminate varies with the materials of construction and the methods of manufacture. Total and complete bonding of the laminated layers one to the other is never possible and voids, however small, between the bonded surfaces are inevitable. Regardless of the selection of materials and bonding methods, and somewhat independent of the severity of use, the pressure of gases and saturated vapors against the diaphragms eventually permeates the elastomeric material and fills any voids between the layers of laminate that may be present. Experience has indicated that voids exist within the sheets of flexible elastomeric material used in these structures, either internally or along their surfaces. With some elastomers the voids can be eliminated by careful forming of the sheet material, but no degree of care can prevent the existence of voids or weakened places in the bonded interface of the laminates.

In a pressurized system as exists on both sides of such a diaphragm, the internal pressure of the laminate structure is the same as or tends to follow that of the external pressure as long as the system is stable or the changes are sufficiently slow to allow equilibrium to be established through permeation or breathing. When saturated vapors are involved in the pressurized system, changes in temperature also leave an effect on the pressure balance, which effect is less pronounced with gaseous medis.

During operation of the diaphragm, as the pressure increases suddenly, the voids tend to be compressed and no immediate damage to the diaphragm results. The internal pressure eventually comes to an equilibrium with the external pressure. This is generally true except where the bond interface between the laminates and around the voids is very weak, in which even sudden fluctuations in internal pressure of the voids causes the voids to become larger.

In those systems where the pressure remains substantially constant and the temperature fluctuates, any decreases in temperature are not necessarily damaging except to set the stage for increases in temperature which cause the gas or vapor in the voids to expand. The results can be disastrous causing rupture of the diaphragm when the internal pressure of the voids suddenly becomes greater than the external pressure of the system and insufficient time is allowed for the gas or vapors in the voids to escape.

A study by the instant applicants of the structural failures of a number of diaphragms which were constructed using an internal layer or porous reinforcing material covered on each side with a layer of a sealing elastomer, shows that the voids remain static when the internal and external pressures are equal, but, as the external pressure drops, the voids are enlarged and the elastomer bulges on the same side of the bond interface at the location of the void. Generally, a sympathetic bulge also occurs simultaneously opposite the bond interface in the elastomer on the other side of the diaphragm.

As flexing of the diaphragm continues, even though the bond interface between the elastomer and the reinforcing material is strong, the void may not enlarge but a large bulge or bubble can occur in the elastomer. Also, opposite the sympathetic bulge a second void or break in the bond interface develops. Two things happen, either the bond is broken and the void enlarged, or the bond holds and the elastomer is stretched to form a bubble. Usually both conditions ensue during operation of the diaphragm. The creation of a large bulge or bubble in the elastomeric layer of the diaphragm results in almost immediate failure of the device having the diaphragm as a component, because the bubble interferes mechanically with the operation or the diaphragm ruptures. Repeated enlargement of the voids and repeated stretching of the elastomer progressively weakens the entire diaphragm and failure results. As soon as differences in the bond strength at the interfaces exist in any part of the diaphragm, the remaining portions thereof are placed under more strain at each flexing or pressure change, leading to the creation of more voids and ultimate failure of the diaphragm. The presences of clamps, washers, support discs as forms of mechanical sealing of the diaphragm, or means for attaining mechanical movement therefrom, accentuates the problem regardless of the bond strength.

Furthermore, clamping of a diaphragm at its periphery, a common expedient in this art, creates a condition which promotes the formation of voids that eventually become co-extensive across the entire arc of the bond interface. It is of interest to note that the formation of a sympathetic bulge on the opposite side of a void is practically unavoidable. The size and incidence of such sympathetic voids appears to be a function of the permeability of the reinforcing material and the bond strength.

SUMMARY OF THE INVENTION

The primary object of this invention is to provide diaphragms which mitigate or eliminate failure due to imperfect bonds by means of a structure which equalizes the pressures and forces working on the diaphragm before the bond is destroyed or overstrained and/or a structure which will not fail even though the bond is destroyed or weakened.

It was initially discovered that the foregoing problems are partially mitigated by reversing the positions of the sealing or elastomeric layer with the porous reinforcing layer, i.e. by placing the reinforcing layer or layers on at least the low pressure side or both sides of an elastomeric layer with or without a bonded interface, or at least a minimum of intermittent and spaced bonding at the interfaces. This type of structure is employed where a high degree of impermeability is critical to the proper functioning of the diaphragm. However, although diaphragms with unperforated reinforcing material on the outside functioned properly, their manufacture is made more difficult because the minimal bonding was difficult to control.

In another embodiment of this invention the known structure of a laminate having an internal layer of reinforcing material covered on each side with an external layer of an elastomeric material is modified by providing spaced minute perforations in the external elastomeric layers which extend to or through the reinforcing layer. By providing the proper spacing and size of perforations, the internal pressure of the structure is relieved before any damage to the diaphragm structure results. This type of diaphragm is suitable where the degree of permeability of the diaphragm is not critical to its proper functioning. Other embodiments will be disclosed.

DESCRIPTION OF THE DRAWINGS

The embodiments of the invention are illustrated in the drawings wherein.

DESCRIPTION OF THE DRAWINGS

Figure 1:
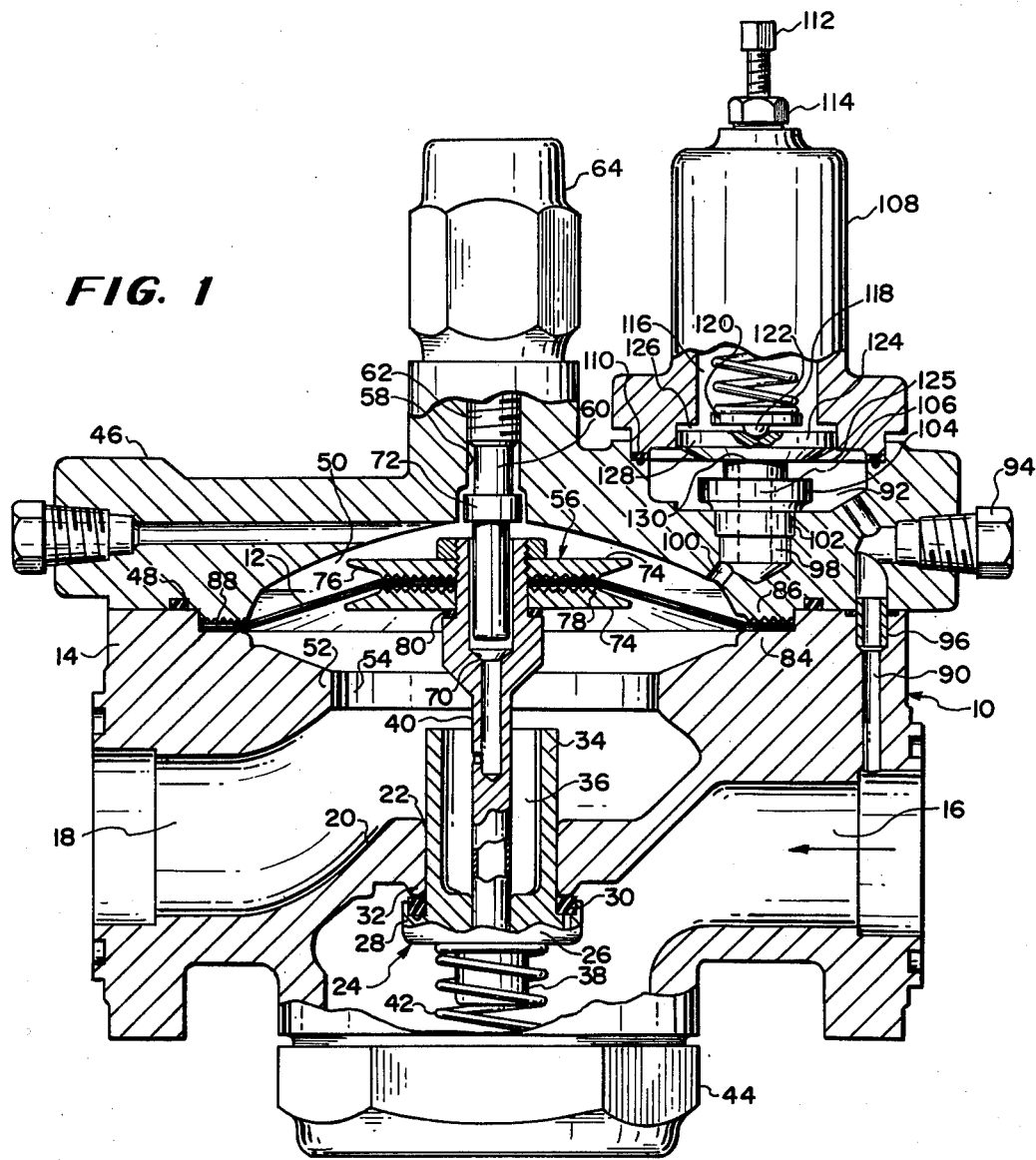
FIG. 1 is a fragmentary cross-sectional view of a diaphragm evaporator pressure regulator to illustrate a typical installation of the diaphragm of this invention.

The various embodiments of the invention are more particularly described in relation to the drawings in which FIG. 1 is an illustration of a pressure regulator 10 having therein the diaphragm 12 constructed in accordance with this invention. The pressure regulator 10 except for certain changes is described in U.S. Pat. No. 3,189,041 by Charles C. Hansen. The regulator is designed to handle refrigerant media passing from the evaporator to the compressor and is illustrative of a type of installation for diaphragms of this invention. Other types of diaphragm-operated devices can benefit by this invention as well as those devices which employ flexible members to open and close against ports or orifices wherein durability and tight seals are desired.

As set forth in greater detail in the Hansen patent, the valve body 14 is formed to define the inlet passage 16 and the outlet passage 18 separated by the wall 20 having a valve port 22 therethrough in which the main valve assembly 24 operates. The valve assembly has the main valve member 26 with the circumferential flange seat 28 providing a recess to receive the O ring 30 of square cross-section constituting the valve seal. The valve seal registers with the valve seat 32 formed around the lower periphery of the valve port 22. The valve member 26 reciprocates within the valve port 22 guided by the integral upstanding fork members 34 which clear the sides of the valve port sufficiently to allow free straight line movement. The fork member 34 define therbetween the elongated open-ended spaces or slots 36 which open to the inlet passage 16 when the valve member 26 is moved downwardly. The valve member 26 has the lower central boss 38 which is centrally bored to receive the valve actuating stem 40 in a press-fit relationship. The boss 38 also serves as a retainer and guide for the valve closing spring 42.

The bottom of the valve body 14 is provided with the valve bottom cover 44 which also provides a seat for the spring 42. The cover 44 is held thereto by suitable threaded engagement, not shown, and the juncture is sealed by an O ring.

The top of the pressure regulator is closed by the cover member 46, suitably attached thereto and sealed as by the O ring 48. The cover and valve body are internally shaped to define the diaphragm chamber 50 defined in part by the internal flange 52 surrounding the enlarged port 54 just below the diaphragm assembly 56.

The top cover has the vertical passage 58 housing the manual opening stem 60 which threadably engages the top portion of the passage, as at 62, in order to be reciprocated by turning. The upper end of the passage is provided with packing rings and a known stuffing box construction which seals around the stem 60 to prevent leakage. The seal cap 64 covers the extended end of the stem 62 having a suitable squared portion to receive a hand wheel or wrench.

The lower end of the manual operating stem 60 seats within the blind bore 66 having the bottom portion 68 of lesser diameter whereby to define a seating shoulder 70 for the stem. The manual opening stem 60 adjusts to provide a limit stop for the diaphragm assembly 56 and is provided with a circumferential shoulder 72 which engages the top of the valve actuating stem 40 upon being tuned down to open the valve assembly 24 manually.

The diaphragm assembly 56 includes a pair of diaphragm followers 74, same being identical and having the inwardly beveled opposing concentric circumferential edges 76 defining a U-shaped groove thereabout around the diaphragm 12. Each of the followers 74 has a series of spiral grooves 78 which are cut at an angle of 60° between adjacent sides and about one-sixty fourth inch deep. The grooves are continuous about the opposing faces of the follower and are clamped together upon opposite sides of the inner portion of the diaphragm 12. The follower and diaphragm seat upon the gasket or O ring 80 held in place by the stem lock nut 82 that engages the top end of the valve acutating stem 40. Suitable central bore holes are provided in the followers and diaphragm to encompass the top end of the actuating stem and be held thereon in the manner illustrated.

The outer peripheral edges of the diaphragm 12 is sandwiched between opposing circular shoulders 84 and 86 of the valve body 14 and the top cover 46, the latter having the spiral groove surface 88 engaging the top part of the diaphragm edge. As an alternative the shoulder 84 may have grooved surface or both surfaces can be planar.

The valve body 46 has the bleeder passage 90 communicating at one end with the inlet 16 and at the other end with the relief valve chamber 92 and is provided with a clean out plug 94 intermediate its ends. The bleeder tube 96 joins and seals the juncture of the two parts of the bleeder passage 90 in the housing members.

The relief valve chamber 92 has the bottom bore 98 communicating with the bleeder port 100 which leads to the diaphragm chamber 50 on the upper side of the diaphragm 12. The top inside portion of the bore 98 is threaded to receive the relief valve port 104 having the central bore opening 106 therethrough. The relief valve bonnet 108 provides a housing and cover for the assembly and is suitably fastened to close the relief valve chamber 92 being sealed by the O rings 110.

At the top of the relief valve bonnet 108 there is provided the adjusting screw 112 which threadably engages therethrough held by the adjusting lock and seal nut 114 and having a spring rest (not shown) at the other end, within the bonnet chamber 116, at the upper end of the diaphragm spring 118. The spring plate 120 is carried by the end of the spring 118 and is provided with a central ball 122 which presses against the diaphragm follower 124 resting on the metallic diaphragm 125. The inner peripheral bottom edge of the bonnet 108 defines the offset circumferential recess 126 receiving the outer edge 128 of the diaphragm follower in reciprocating relationship.

The spring 118 can be supplemented by a second spring (not shown) whereby several ranges of adjustment can be imparted to the assembly. The flat top surface 130 of the relief valve port member 104 is flush and seals against the metallic diaphragm 125 to close same under the compression force of the spring 118. Any increase in inlet pressure at inlet 116 is imparted to the chamber 92 and opens the bore 106 communicating to the upper side of the diaphragm 12. The pressure differential at which this occurs is a matter of choice and adjustment of the parts to perform as desired in the system incorporating the valve is disclosed in said Hansen patent.

The valve 10 is shown in its closed position. During operation refrigerant enters inlet 16' for the evaporator and is controlled by the valve 24 in its passage through the outlet 18 to the compressor in a manner known in the art. Such a system may operate under wide ranges of temperature and pressure depending on the load, the type of refrigerant medium and the desired conditions of operation. Temperatures may vary from ambient to −100° F and the pressures as high as 300 psig in some applications.

Figure 2:
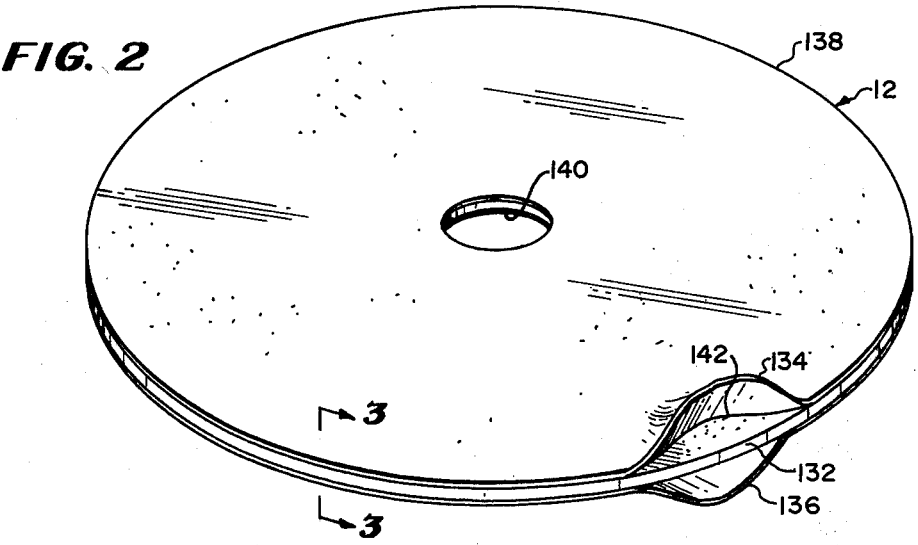
FIG. 2 is an isometric view of a diaphragm of this invention with portions of the reinforcing layers separated fom the sealing layer for illustration.

In order to withstand the foregoing conditions of operation the diaphragm 12, as shown in FIG. 2, is constructed of an inner layer 132 of elastomeric sealing material with at least one layer on the low pressure side LP (FIG. 3A) but preferably with outer layers 134 and 136 of the same or different kind of reinforcing material. The diaphragm may have the rounded edge 138, as illustrated, or be of any desired shape and is provided with a center hole 140 for this particular installation. The juncture or bonded surface 142 on each side of the respective layers is the area of primary concern in accordance with one aspect of this invention.

Figure 3:
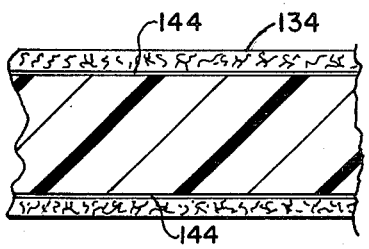
FIG. 3 is an enlarged cross-sectional view taken along the lines 3—3 of FIG. 2 to show an unbonded construction.
Figure 3A:
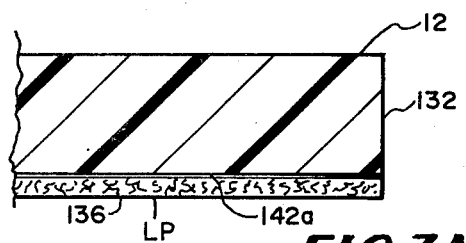
FIG. 3A is an enlarged cross-sectional view similar to FIG. 3 to show fabric required only on the low pressure side if the pressure drop across the diaphragm does not reverse.

As illustrated in FIG. 3, the top reinforcing layer 134 and the bottom reinforcing layer 136 which form the bodying structures across both faces of the diaphragm 12 are not bonded to the elastomeric sealing layer 132 as indicated by the gap or space 144 which extends across the entire juncture 142 except along the periphery where these parts would be held in juxtaposition by the opposing flanges 84–86 shown in FIG. 1. The juncture 142 can represent a bonded area of the diaphragm on both or only one side of the elastomeric layer. Thus, the juncture 142a can be bonded on the periphery of the diaphragm.

Figure 4:
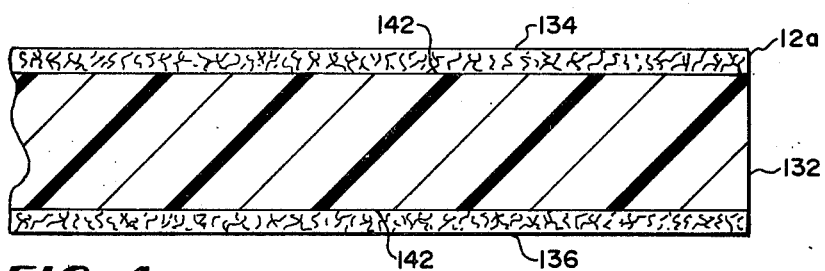
FIG. 4 is an enlarge cross-sectional view of a portion of a diaphragm having minimal bonding.
Figure 5:
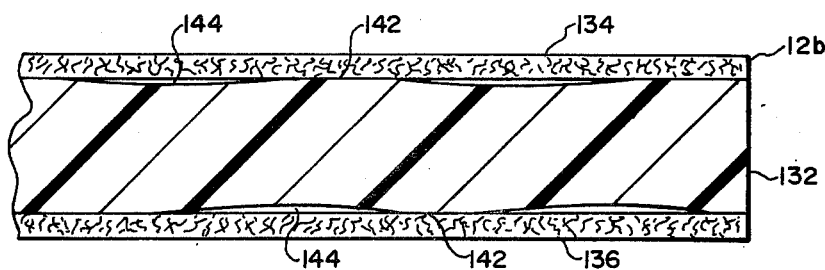
FIG. 5 is an enlarged cross-sectional view of a portion of a diaphragm having intermittent bonding.

In the modified diaphragm 12a shown in FIG. 4 the elastomeric sealing layer 132 is joined along the interfaces 142 by a continuous thin layer or film of adhesive or bonding material to the respective layers 134 and 136 of fabric or reinforcing material. Although this structure represents an improvement in the life of the diaphragm, the thinly bonded minimal interface 142 is difficult to control. Still another embodiment is shown in FIG. 5 wherein the diaphragm 12b is comprised of the elastomeric layer 132 joined by the discontinous bonded junctures 142 to the respective reinforcing layers 134 and 136 and the gaps or spaces 144, representing unbonded areas, are intermittent therealong.

In accordance with this latter embodiment of the invention some variation in the respective total bonded areas or junctures 142 and the respective total non-bonded areas or gaps 144 can be used depending on the conditions under which the diaphragm will be used. The bonded areas 142 can represent from about 20% to 80% of the entire area of the diaphragm. Preferably the ratio of bonded to non-bonded areas is about 50/50 and they are uniformly spaced about the respective junctures radially or circumferentially about the diaphragm. Those areas where the greatest flexing of the diaphragm takes place, such as the parts which are not held by flanges or diaphragm followers, are particularly benefitted by the application of the structures described in FIGS. 3, 4 and 5. Those areas of the diaphragm which are held by flanges or diaphragm followers can be bonded, unbonded or partially bonded as desired.

Figure 6:
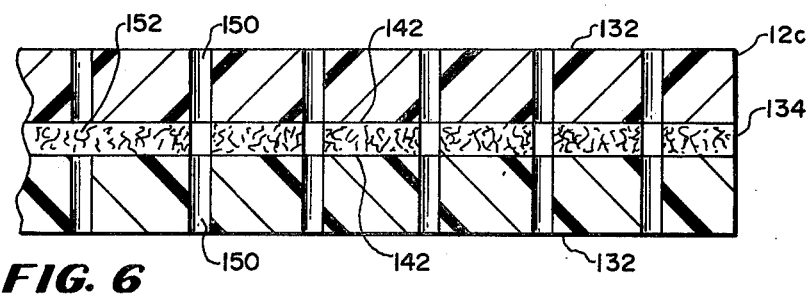
FIG. 6 is an enlarged cross-sectional view of a portion of a diaphragm of reverse construction with external breathing.

In FIG. 6 still another embodiment of the invention is shown wherein the known structure of a diaphragm 12c is shown comprising the inner reinforcing layer 134 which is bonded along the junctures 142 to the elastomeric layers 132 which have a plurality of spaced perforations 150 therethrough. The perforations extend entirely through the elastomeric layers 132 so that the diaphragm breathes through the fabric which is porous or semi-porous. In the event it is desired to depend on the porosity of the fabric layer for the breathing characteristic of the diaphragm the area 152 between several or all of the perforations 150 can be left intact so that the perforations do not extend through the fabric layer. Although in the cross-section shown in FIG. 6, the perforations, which are greatly enlarged for purposes of illustration, are shown to be co-axial of each side of the fabric layer, this invention is not to be so limited. Thus, where the perforations 150 do not extend through the fabric layer 134, they need not be co-axial. However, the construction shown is preferred, with or without all of the perforations extending through the fabric in a straight line through the diaphragm body, since this reduces any tendency of the destruction of the bonded areas 142 during operation of the diaphragm.

FIGS. 7 to 12 show additional preferred embodiments of the diaphragm structures of this invention based on the finding that by perforating the low pressure sides of the diaphragm whether composed of reinforcing material or elastomer greatly improves the performance and durability of the structures. In each of these embodiments the low pressure side is the top of the diaphragm and the high pressure side is the bottom side.

Figure 7:
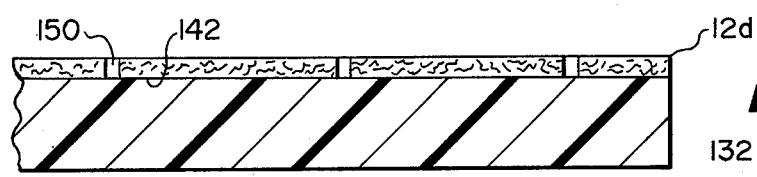
FIG. 7 is an enlarged cross-sectional view of a portion of a diaphragm having perforated reinforcing material on the upper or low pressure side.
Figure 8:
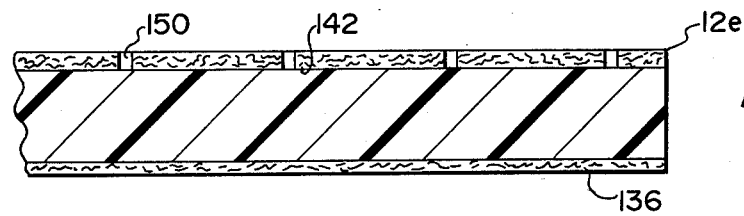
FIG. 8 is an enlarged cross-sectional view of a portion of a diaphragm like that of FIG. 7 with a layer of reinforcing material on the high pressure side.
Figure 9:
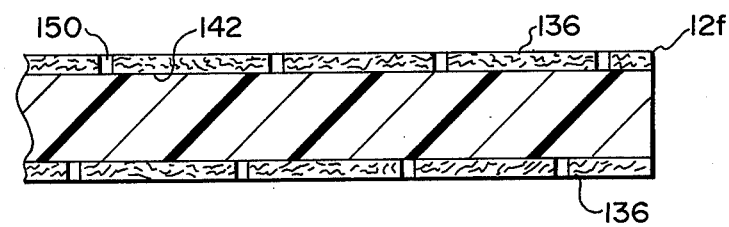
FIG. 9 is an enlarged cross-sectional view of a portion of a diaphragm like that of FIG. 8 with a layer of perforated reinforcing material on the high pressure side.

In FIG. 7 the elastomeric layer 132 is bonded on its low pressure side to the layer 134 of reinforcing material having the spaced perforations 150, to form the diaphragm 12d. The diaphragm 12e of FIG. 8 is the same except for the inclusion of the non-perforated fabric layer 136 on the high pressure side. FIG. 9 shows the diaphragm 12f with both fabric layers perforated.

Figure 10:
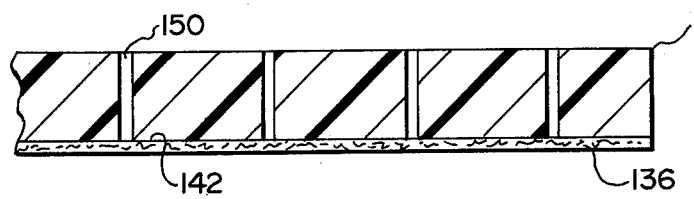
FIG. 10 is an enlarged cross-sectional view of a portion of a diaphragm with a layer of perforated elastomer on the lower pressure side and unperforated reinforcing material on the high pressure side.
Figure 11:
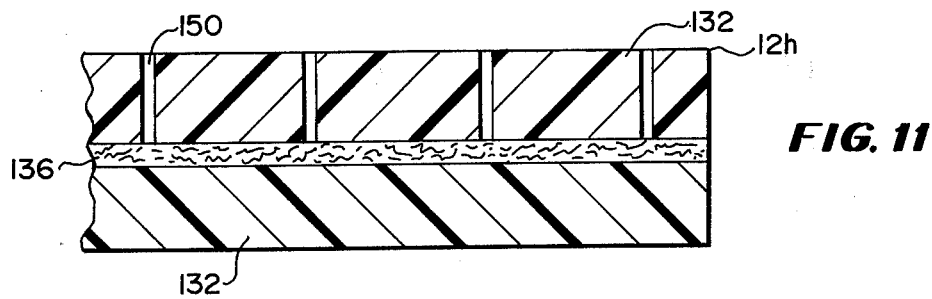
FIG. 11 is an enlarged cross-sectional view of a portion of a diaphragm like FIG. 10 with an outer layer of elastomer on the high pressure side.
Figure 12:
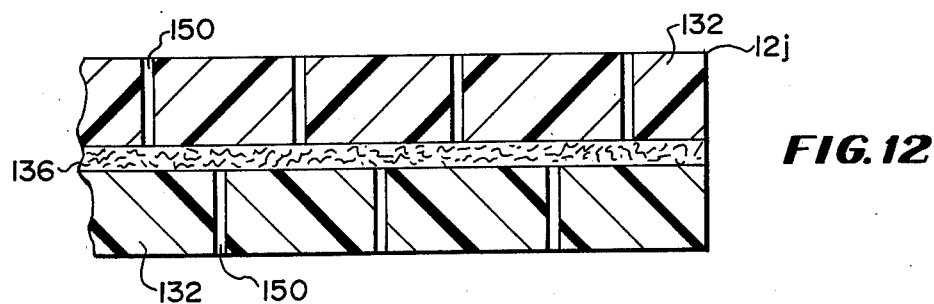
FIG. 12 is an enlarged cross-sectional view of a portion of a diaphragm like FIG. 11 with the layer of elastomer on the high pressure side perforated.

The structures 12g, 12h and 12j, shown in FIGS. 10–12, are related in that each presents an elastomeric layer 132 on the low pressure side which contains the perforations 150. The high pressure sides of these diaphragms can be reinforcing fabric 136, or combined unperforated fabric and elastomeric layers as in diaphragm 12h or with the elastomeric layer on the high pressure side in perforated form as in FIG. 12.

As in the case of the diaphragm of FIG. 6, the perforations 150 in the embodiment of FIG. 12 may be substantially coaxial through each of the layers or laterally off-set or combinations of these arrangements. The bonded areas 142 between the perforations 150 of the embodiments shown in FIGS. 6–12 are preferably continuous throughout the interfaces between the layers. Care should be exercised in applying the bonding material so as to avoid clogging the fabric material therewith. The presence of the perforations materially prolongs the useful life of the diaphragms and prevents clogging of the fabric layers.

The perforations 150 need be nothing more than pin pricks through the fabric and can be punched holes where close weave fabric is used. The number of perforations per unit area depends on the natural porosity of the fabric and the degree of stress and flexure that the diaphragm will experience during use. From as little as 10 to as many as 500 perforations per square inch can be used, provided they are of very small diameter, in the order of 0.01 inch or so. Even spacing of the perforations assures freedom from damaging voids at the interface 142.

The invention may be applied to different shapes and thicknesses of diaphragms, flap valves and washer valve constructions without limitation as to construction materials as long as one or more sealing or non-porous flexible layers are present and one or more reinforcing layers. The elastomeric material can be any material which is essentially non-porous to form a liquid or gaseous barrier while the reinforcing layer can be any essentially fibrous or woven material characterized by its flexing strength without regard to its porosity. Generally elastomers which stretch under the conditions of use with low stress to at least twice their length and have the ability to snap back or return to their original length upon release of the stress can be used. Examples of such materials are natural and synthetic rubber, neoprenes, and Buna rubbers. A product of the neoprene family sold under the proprietary name of "Hydrin" represents a preferred elastomer. Silicone-elastomers, silicone flexible resins, Styrene-butadiene rubbers, polyisoprene rubbers, represented by the commercially available compounds: Silicone compound SE555, Dow Corning compounds, LS63 and S-2096U and Anchor Packing Company Neoprene rubber 30-N-56, all provide the desired characteristics both physically and chemically to function properly throughout the entire range of temperatures and pessure required by the valve 10.

The reinforcing layers 132 can be woven materials such as cloth or fabric including nylon, rayon, nylon-rayon combinations, or natural fibers. The reinforcing layers 134 or 136 can be single or multiple and of various mat thicknesses. Nylon or Dacron cloth of relatively close weave is a preferred fabric. Fiber glass fabric, glass mat, asbestos fabric and cotton fabric can also be used.

The adhesives used to form the bonds 142 can be resins, epoxides, vinyls, etc. A good bond between rubber and nylon can be attained by using neoprene or a reclaimed elastomeric. In general a number of elastomeric materials are available as adhesives including natural rubber, nitriles, urethanes, and styrene-butadienes. Some thermoplastic materials such as Polyvinyl acetate and polyamides, and certain rubber lactices and resin-emulsions can be used. The selection of a suitable adhesive is within the skill of one in this art and such considerations as high strength/weight ratio, flexibility, thermal, flexural and durability characteristics of the adhesives are well known. The bonding strength and ability to adhere under flexural stress and in the presence of chemicals are of primary importance except where destructive environments may be encountered which may dictate other choices of adhesive. The adhesive layer can be applied by bruch coating, spray, dipping or roller means. Heat sealing of the elastomer to the fabric layer or layers may also be used as well as induction and ultrasonic bonding. The diaphragms of this invention adapt themselves to the use of a grooved gripping surface, as illustrated by the surfaces 78 and 88 shown in FIG. 1 about the follower members holding center of the diaphragm 12 and the flanges 84–86 about the periphery of the diaphragm. By placing the tougher less pliable fabric surface on the outside surfaces of the diaphragm 12, as illustrated in FIGS. 3, 4 and 5 the corrugated or roughened holding surfaces press against a more tear resistant part of the diaphragm. This causes the bending forces that are acting on the elastomeric layer to be better distributed and eliminates metal-to-elastomer contact that may gall or break the softer elastomeric material.

What is claimed is:

1. A flexible diaphragm for use in a pressurized system within a valve chamber and dividing said chamber into a low pressure side and a variable high pressure side, comprising:

a first sealing layer of a flexible elastomeric material that is readily stretchable under low stress to twice its length and capable of return to its original size upon release of this stress disposed on the high pressure side of the diaphragm;

a reinforcing layer of porous fabric material substantially coextensive with said elastomeric sealing layer, said layers being bonded to each other over their interface juncture area between the layers;

a second stretchable sealing layer of elastomeric material disposed on the low pressure side of the diaphragm having a plurality of spaced normally closed minute pinprick perforations therethrough extending through the reinforcing layer at said interface for equalizing pressures on opposite sides of said second layer.

2. A flexible diaphragm in accordance with claim 1 in which said first sealing layer has a plurality of spaced pinprick perforations therethrough extending to said interface.

3. A flexible diaphragm is accordance with claim 1 in which:

said second sealing layer on the low pressure side and the porous fabric layer are bonded to each other at their interface juncture without clogging the fabric material and with the perforations extending through to at least said interface juncture.

4. A flexible diaphragm in accordance with claim 1 in which:

the elastomeric material included on the high pressure side defines a bonded interface with said layer of fabric material at the interface area between them.

5. A flexible diaphragm in accordance with claim 4 in which said layer of elastomeric material on the high pressure side has a plurality of spaced pinprick perforations therethrough extending to said interface juncture.

6. A flexible diaphragm in accordance with claim 5 in which said perforations are offset in the respective layers.

7. A flexible diaphragm in accordance with claim 1, in which said pin-prick perforations in the sealing layers terminate at an unperforated interface surface of the fabric layer.

8. A flexible diaphragm in accordance with claim 5 in which said perforations in said elastomeric layers are substantially coaxial to each other.

9. A flexible diaphragm in accordance with claim 5 in which said layer of fabric material has a plurality of spaced perforations extending through to said respective interfaces.

* * * * *